Feb. 3, 1942.   C. C. COONS ET AL   2,271,544
REFRIGERATION
Filed Feb. 5, 1940
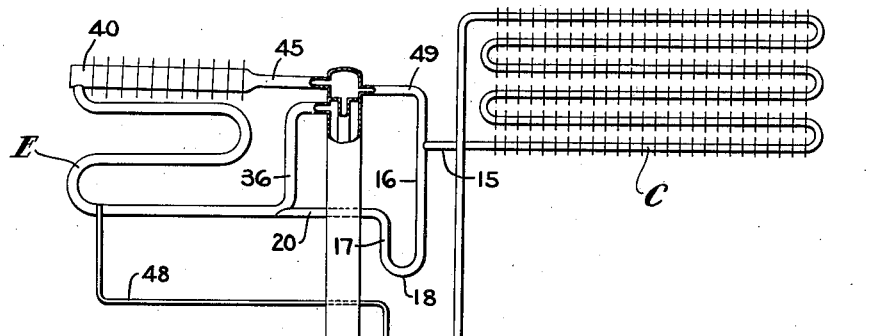
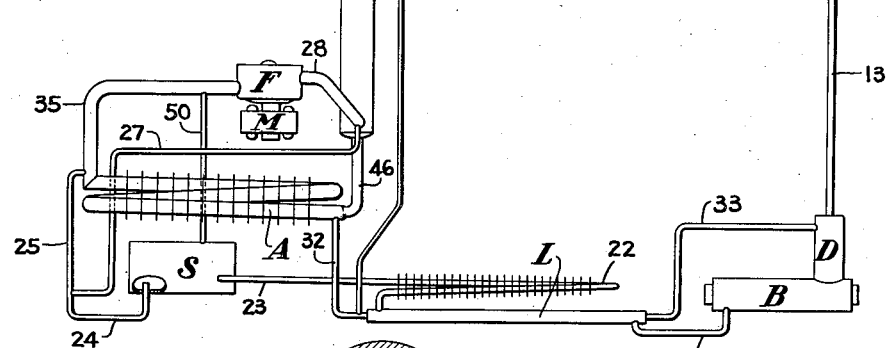
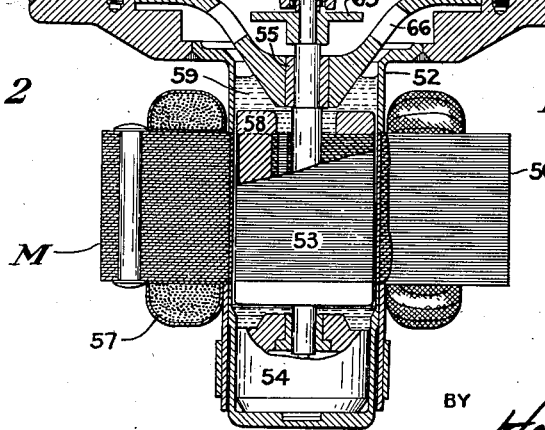
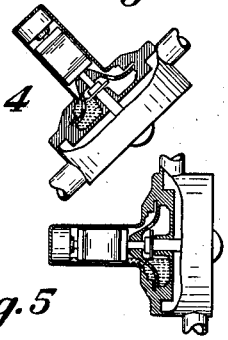
INVENTORS
Curtis C. Coons &
Stanley R. Cummings
BY Harry S. Ducarse
ATTORNEY Patented Feb. 3, 1942

2,271,544

UNITED STATES PATENT OFFICE 2,271,544

REFRIGERATION

Curtis C. Coons, North Canton, and Stanley R. Cummings, Canton, Ohio, assignors to The Hoover Company, North Canton, Ohio, a corporation of Ohio Application February 5, 1940, Serial No. 317,386

25 Claims. (Cl. 62—119.5)

This invention relates to refrigeration and more particularly to an absorption refrigerating apparatus of the type using an inert pressure equalizing medium for equalizing the pressures within the system and power driven means for circulating the mediums in the system.

In refrigerating apparatus of this type it is necessary that some means be provided for lubricating the moving parts of the power driven means, and since these moving parts are usually sealed within the interior of the system, it is necessary to provide some means which will be operative for long periods of time, and in which the lubricant will be retained in the part of the system in which it is useful and not be dissipated to other parts of the system.

One way of lubricating the moving parts of a power driven means for circulating the mediums in an absorption refrigerating apparatus, is to provide a motor-fan unit in which the motor rotor is submerged in a lubricant at all times. It is therefore necessary to place the motor fan unit in some part of the apparatus which is inaccessible to the liquid mediums in the system during operating periods as well as to prevent the mixing of the oil and the refrigerating mediums during shipment or during other handling operations.

It is therefore an object of this invention to provide a motor fan unit for circulating the mediums in an absorption refrigerating apparatus in which the motor rotor is submerged in a lubricant, in which the motor fan unit is placed in that part of the system inaccessible to liquid mediums during operating periods and in which means is provided for preventing the lubricant from getting out of the motor during shipment or during other handling operations.

When a lubricant comes into contact with a refrigerating medium, such as ammonia, some of the ammonia vapor inevitably is absorbed by the lubricant and when the pressure is released this vapor expands causing the lubricant to boil or foam. When the lubricant boils or foams, some of the lubricant will pass off with the escaping ammonia vapors.

In absorption refrigerating apparatus of the type using ammonia as a refrigerant, water as the absorbent and a pressure equalizing medium, the total pressure within the system varies considerably between running and idle periods depending upon the duration of the "on" and "off" periods and upon the amount of heat supplied to the boiler during "off" periods. Now if a lubricant is used for lubricating the moving parts of the apparatus, this variation in pressure will cause some boiling off of the ammonia vapor from the lubricant and eventually cause the lubricant to be dispersed to other parts of the apparatus unless some means is provided to prevent it.

It is therefore another object of this invention to provide an absorption refrigerating apparatus with power means for circulating the mediums in which the moving parts are lubricated with means for preventing the boiling off of the lubricant to other parts of the apparatus.

In present day refrigerating machines it is essential that the machines operate for very long periods without servicing, and if the moving parts are sealed within the apparatus that they will last the life of the machine. It is necessary to provide an original charge of lubricant which will be sufficient to lubricate the moving parts for the life of the machine.

It is therefore another object of this invention to provide an absorption refrigerating apparatus of the type using power means for circulating the mediums sealed within the apparatus in which sufficient lubricant is provided in the original charge to last the life of the apparatus.

More particularly, it is an object to provide a motor-fan unit for circulating the mediums in an absorption refrigerating apparatus in which a partition separates the fan from the motor rotor and forms with the rotor casing a reservoir which will retain all of the lubricant in the rotor casing regardless of the position in which the apparatus is placed during shipment or other handling periods, which will provide sufficient space into which the vapors absorbed in the lubricant may be liberated to prevent boiling off of the lubricant and to provide a sufficient capacity to hold a charge of lubricant which will last the life of the machine.

Other objects and advantages of the invention will become apparent as the description proceeds when taken in connection with the accompanying drawing, in which:

Figure 1 is a diagrammatic view of an absorption refrigerating apparatus with the motor fan unit of this invention applied thereto;

Figure 2 is a longitudinal sectional view of the motor fan unit of this invention;

Figure 3 depicts the oil level in the motor shell when the apparatus is inverted;

Figure 4 depicts the oil level in the motor shell when the apparatus is tipped at an angle, and Figure 5 shows the oil level in the motor shell when the apparatus is laid on its side.

Referring to Figure 1 of the drawing, there is disclosed a three fluid absorption refrigerating system comprising a boiler B, an analyzer D, an air cooled rectifier R, a tubular air-cooled condenser C, an evaporator E, a gas heat exchanger G, a tubular air-cooled absorber A, a solution reservoir S, a liquid heat exchanger L, and a circulating fan F which is driven by an electric motor M.

The above described elements are interconnected by various conduits to form a plurality of gas and liquid circuits constituting a complete refrigerating system to which reference will be made in more detail hereinafter.

The refrigerating system will be charged with a suitable refrigerant, such as ammonia, a suitable absorbent, such as water, and a suitable pressure equalizing medium, such as nitrogen.

The boiler B will be heated in any suitable manner, such as by an electrical heater or by any well known gas burner, as may be desired.

The application of heat to the boiler B liberates refrigerant vapor from the strong solution contained therein. The vapor so liberated passes upwardly through the analyzer D in counterflow relationship to strong solution flowing downwardly through the analyzer. Further refrigerant vapor is generated in the analyzer by the heat of condensation of absorption solution vapor generated in the boiler. The refrigerant vapor is conducted from the upper portion of the analyzer D to the upper portion of the condenser C through a conduit 13 which includes the air cooled rectifier R wherein any vapor of absorption solution passing through the analyzer is condensed and returned to the analyzer through the conduit 13.

The refrigerant vapor is liquefied in the condenser by heat exchange relation with atmospheric air and is discharged from the bottom portion thereof through a conduit 15 into a downwardly extending conduit 16. The bottom portion of the conduit 16 connects to the bottom portion of an upwardly extending conduit 17 through a U-bend 18. The conduit 16 is appreciably longer than the conduit 17 for a purpose to be described later. The conduit 17 opens at its upper end into a conduit 20 which discharges into the evaporator in a manner to be described more fully hereinafter.

The weak solution formed in the boiler by the generation of refrigerant vapor therefrom is conveyed from the boiler through a conduit 21, the outer pass of liquid heat exchanged L, through a pre-cooler 22 and a conduit 23 into the solution reservoir S. The weak solution is conveyed from the solution reservoir S through a U-shaped conduit 24 opening into an upwardly extending tube 25 of small diameter, forming a gas lift pump which discharges into the top of the absorber A. It is apparent that the top of the absorber is materially above the solution level normally presiding in the boiler-analyzer-reservoir system wherefor some means must be provided to elevate the absorption solution to the top of the absorber A. For this purpose a small bleed conduit 27 is connected to the discharge conduit 28 of the circulating fan F and leads to the junction of the conduits 24 and 25 which is below the solution level normally presiding in the reservoir whereby the weak solution is elevated to the top of the absorber by gas lift action.

In the absorber, the weak solution flows downwardly by gravity in counterflow to the rich pressure equalizing medium refrigerant vapor mixture flowing upwardly therethrough. The refrigerant vapor content of the mixture is absorbed in the absorption solution and the heat of absorption is rejected to the surrounding air by air cooling fins which are mounted on the exterior walls of the absorber vessel. The strong solution formed in the absorber discharges into conduit 32 which opens into the inner pass of the liquid heat exchanger L. From the inner pass of the liquid heat exchanger L, the strong solution is conveyed to the upper portion of the analyzer D by conduit 33 whereby it flows downwardly through the analyzer in counterflow to the rising vapors generated in the boiler.

The weak pressure equalizing medium refrigerant vapor mixture present in absorber A is taken from the upper portion thereof through the conduit 35 into the suction side of the circulating fan F in which it is placed under pressure and discharged through conduit 28 into the outer pass of the gas heat exchanger G and therefrom through a downwardly extending conduit 36 into the bottom of the evaporator E.

The conduit 20 opens into the bottom portion of the conduit 36 whereby the liquid refrigerant supplied to the evaporator enters simultaneously with the pressure equalizing medium which is placed under pressure by the circulating fan F. The diameter of the conduit of the evaporator is relatively small whereby the pressure equalizing medium flows through it at a relatively high velocity. The rapidly flowing pressure equalizing medium sweeps or drags the liquid refrigerant with it through the evaporator into the box cooling conduit 40 as the refrigerant is evaporated by diffusion into the pressure equalizing medium to produce refrigeration. In the conduit 40 the velocity of the inert gas stream is relatively slow by reason of the large diameter of that conduit and the liquid refrigerant flows therethrough by gravity. Any liquid refrigerant not evaporated in the evaporator will flow through conduit 45, the inner pass of the gas heat exchanger G and pass by conduit 46 to the bottom of the absorber so as not to interfere with the operation of the motor fan unit.

The rich pressure equalizing medium refrigerant vapor mixture formed in the evaporator is conducted therefrom into the inner pass of the gas heat exchanger G through a conduit 45. The opposite end of the gas heat exchanger G communicates with the bottom portion of absorber A through a conduit 46. In the absorber A the rich pressure equalizing medium refrigerant vapor mixture flows upwardly in counterflow to absorption solution whereby the refrigerant vapor content of the mixture is absorbed by the weak solution.

The bottom coil of evaporator E is provided with a drain conduit 48 which opens into the strong solution discharge conduit 32. The conduit 48 opens into the top portion of the bottom coil of the evaporator whereby it will not completely drain such conduit. The upper portion of discharge conduit 15 of the condenser is vented through a vent conduit 49 into the inner pass of the gas heat exchanger G. The solution reservoir is vented through a conduit 50 into the suction conduit 35 of the circulating fan.

The circulating fan F places the pressure equalizing medium discharged therefrom under a small pressure in the neighborhood of a pressure of a few inches of water over that prevailing at the suction side of the fan. In order to prevent this pressure, which also prevails in the conduit 36, from being carried back through the condenser discharge conduit, the condenser and conduit 13 to the analyzer, the conduit 16 is made appreciably longer than the conduit 17 whereby a pressure balancing column of liquid is formed in the conduit 16 which extends above the point of connection between the conduits 17 and 20 a distance sufficient to overcome the pressure produced by the circulating fan in the conduit 36.

The motor fan unit comprises a fan casing 51 and a cylindrical shell 52 forming a housing for the fan F and the motor rotor 53. The motor rotor 53 is connected to a fan F by a shaft which is suitably supported for rotation by bearing assemblies 54 and 55. On the exterior of the shell 52, opposite the rotor 53 is a field stack 56 having windings 57. The rotor 53 has cast aluminum conductor bars and end rings 58 and is submerged in a lubricant 59 in the interior of the shell 52.

In order to hold the lubricant 59 in the interior of the shell 52 when the apparatus is being shipped or during other handling operations, to provide a lubricant reservoir and a diffusion space for vapors absorbed in the lubricant, a partition member 60 having an opening for the motor shaft is suitably secured to the interior of the casing 51, as by means of bolts 61. The partition member 60 has a downwardly extending portion 62 for a purpose to be described later. The partition 60 forms with the bottom of the casing 51 and the shell 52, a reservoir for holding the oil 59 in the shell 52 regardless of the position in which the apparatus is placed.

A disk 65 is preferably secured to the motor shaft intermediate rotor 53 and sleeve 62 on partition 60. The principal function of this disk or throw-off ring is to prevent oil from creeping up the shaft and escaping from the reservoir. Any oil which does reach the disk is thrown off by centrifugal action and returned to the main body through openings 66. Disk 65 also serves as a seal closing the vent existing between the motor shaft and tube 63 under certain circumstances. Thus, if the apparatus is up-ended for any reason the weight of rotor 53 will bring disk 65 into sealing engagement with the lower end of sleeve 62 and tube 63, thereby preventing the lubricant from escaping or liquids within the system from entering. As soon as the apparatus is returned to normal operating position, the rotor will fall back into the position shown in Figure 2 and the vent will be again opened. In order to insure a positive seal between disk 65 and sleeve 62, the cooperating faces of these elements may be suitably shaped and, if desired, one or both may be surfaced with a soft sealing material which will have long life and will not be affected by the mediums within the system.

Since the pressure within the system is substantially equalized throughout all parts of the system, only a small fan need be used for circulating the mediums, and in fact, the fan need only develop a pressure difference equivalent to a few inches of water. It can be seen that the motor may be made very small. This is particularly true if a dense gas like nitrogen is employed as the pressure equalizing medium. Lighter gases may be used but require a larger motor-fan unit. If hydrogen is used, rotor 53 may be between one and one-quarter and one and one-third inches in diameter and about two inches in length. It can thus be seen that the amount of oil in the shell 52 necessary to cover the rotor, is very small and that therefore the size of the reservoir formed by the partition 60 need not be large in order to hold all this oil in any position that the apparatus may be placed.

In Figure 3 the oil level is shown when the apparatus is inverted and it can be seen that the level is below the projection 62 on the partition 60.

In Figure 4 the unit is positioned at approximately a forty-five degree angle and still the oil level does not come above the projection 62 on the partition 60.

In Figure 5 the unit is shown positioned on its side and the oil level is still below the opening in the partition 60. It can thus be seen that regardless of the position in which the unit is placed that the oil 59 will be retained in the shell 52 and will thus always be available for lubricating the rotor when the apparatus is returned to its operative position.

The vapor absorbed in the oil will have ample space below the partition into which to diffuse when the pressure in the machine goes down during idle periods so that the oil will not be carried with the vapor through the opening in the partition 60 to other parts of the apparatus. The oil in the shell 52 will also be ample to lubricate the rotor for the entire life of the apparatus.

It can be seen from Figure 1 that the liquid refrigerant unevaporated in the evaporator E cannot reach the motor fan unit since it flows through tubes 45 and 46 to the bottom of the absorber. Any liquid mediums that may condense in the outer pass of the gas heat exchanger G will flow to the bottom thereof and be drained therefrom through the bleed conduit 27. Any liquid mediums which may condense in the fan casing, or which may reach there when the apparatus is tipped, will be kept from entering the shell 52 by the partition 60 and member 63 extending upwardly from the partition 60 as shown in Figure 2. When the machine is righted from a tipped position any liquid medium in the fan casing 51 will be trapped by the partition 60 and member 63 and be drained back through the conduit 35 to the top of the absorber so as not to interfere with the operation of the motor fan unit. It will therefore be clear that tube 63 cooperates with partition 60 to prevent liquid from entering the rotor chamber to contaminate or displace the lubricant.

It can thus be seen that this invention provides a motor fan unit for circulating the medium in an absorption refrigerating apparatus in which the motor fan unit is positioned in that part of the apparatus which is normally inaccessible to liquid mediums and at the same time has the rotor submerged in oil for lubricating the same with means for preventing the oil from getting out of the motor shell during shipment or other handling operations together with means for preventing the liquid mediums reaching the motor shell when the machine is tipped.

The lubricant in addition to lubricating the rotor also serves to protect the aluminum conductor bars and end rings from the corrosive action of the ammonia.

While our novel motor-pump assembly has been described as mounted in an upright position with the fan chamber above the motor, it will be understood that the principle of the invention may be practiced with the unit in any position including upright, inverted, horizontal or any intermediate position. In the majority of the alternative positions, the rotor will not be totally submerged. In fact, in some of these positions the rotor and bearings will not be submerged at all except when the apparatus is placed in an abnormal position. In such constructions it will be necessary to provide wicking or other well known devices for supplying the bearing assemblies with lubricant. But, as will be clear from Figures 2 to 5, regardless of the position of the unit, the present invention provides a construction having a lubricant reservoir from which the lubricant cannot escape and into which foreign liquids cannot flow.

While we have shown but one embodiment of the invention it is to be understood that this embodiment is to be taken as illustrative only and not in a limiting sense. We do not wish to be limited to the particular structure shown and described but to include all equivalent variations thereof except as limited by the scope of the claims.

We claim:

1. An absorption refrigerating apparatus comprising circuits for liquid and gaseous mediums, power operated means for circulating said mediums in said circuits, said power operated means comprising a motor fan unit with the motor rotor submerged in a lubricant displaceable by the liquid within said apparatus, said power means being positioned in a part of the gas circuit normally inaccessible to said liquid but subject to being flooded with said liquid during shipment or other handling operations, and means between the motor and fan for separating the motor rotor from the fan, said means including a reservoir so constructed as to hold the entire charge of lubricant regardless of the position in which the apparatus is placed.

2. An absorption refrigerating apparatus comprising a circuit for a liquid medium in the apparatus, means including power operated means for circulating said medium in said circuit, said power operated means comprising a motor fan unit in which the motor rotor is positioned in a casing and submerged in a lubricant and the fan is positioned in a fan chamber, said power operated means being positioned in that part of the circuit normally inaccessible to said circulating liquid medium during operating periods, said casing being of such shape and size as to retain the entire charge of lubricant therein regardless of the position in which the apparatus is placed.

3. An absorption refrigerating apparatus as set forth in claim 2 characterized in that the motor casing is provided with means for excluding any liquid which may be present in the fan chamber.

4. An absorption refrigerating apparatus comprising a circuit for a medium in the apparatus, power operated means for circulating the medium in said circuit, said power operated means comprising a vertically positioned motor casing for housing a motor rotor and fan, said motor rotor being submerged in a lubricant, said casing being so constructed and arranged as to contain all the lubricant regardless of the position in which the apparatus is placed.

5. An absorption refrigerating apparatus comprising circuits for liquid and gaseous mediums in the apparatus, a motor fan unit for circulating the mediums in their circuits, said motor fan unit including a fan casing and a rotor shell with an apertured partition therebetween and said shell being charged with a lubricant, said partition and shell being of such shape and size that the level of the charge of lubricant in the shell will not reach the aperture in the partition regardless of the position in which the apparatus is placed.

6. An absorption refrigerating apparatus comprising, a boiler, a condenser, an evaporator and an absorber, conduits connecting the boiler and absorber to form a solution circuit therebetween, conduits connecting said evaporator and absorber to form a gas circuit therebetween, a motor fan unit positioned in said gas circuit for circulating the gas in its circuit, a conduit connecting the fan exhaust with the solution circuit and being so arranged therewith as to utilize gas from the gas circuit for circulating the solution in its circuit, a conduit leading from the condenser to the evaporator for conducting liquid refrigerant thereto and being so arranged relative to the gas circuit as to utilize the pressure built up by the fan to circulate condensate in the evaporator, said motor fan unit being arranged in a part of the gas circuit inaccessible to liquid flowing in said solution circuit and comprising a casing having an upper fan housing and a lower rotor housing containing a lubricant, a reservoir between the fan housing and rotor housing and being so constructed and arranged as to hold the entire charge of lubricant regardless of the position in which the apparatus is placed, and means for preventing liquid which may find its way into said gas circuit from entering said rotor housing.

7. An absorption refrigerating apparatus comprising a condenser, an evaporator and an absorber, conduits connecting said evaporator and absorber to form a gas circuit therebetween, a motor fan unit positioned in said gas circuit for circulating the gas in its circuit, a conduit leading from the condenser to the evaporator to conduct liquid refrigerant thereto and being so arranged relative to the gas circuit as to utilize the pressure built up by the fan to circulate condensate along the evaporator, said motor fan unit being arranged in that part of the gas circuit normally inaccessible to liquid mediums and comprising a casing having an upper fan housing and a lower rotor housing containing a lubricant, a reservoir between the fan housing and rotor housing and being so constructed and arranged as to hold the entire charge of lubricant regardless of the position in which the apparatus is placed.

8. An absorption refrigerating apparatus comprising a condenser, an evaporator and an absorber, conduits connecting said evaporator and absorber to form a gas circuit therebetween, a motor fan unit positioned in said gas circuit for circulating the gas in its circuit, a conduit leading from the condenser to said evaporator to conduct liquid refrigerant thereto and being so arranged relative to said gas circuit as to utilize the pressure generated by the fan for circulating liquid refrigerant in the evaporator, said motor fan unit being positioned in that part of the gas circuit leading from the absorber to the evaporator whereby it is normally free of liquid mediums in the apparatus, said unit comprising a casing having an upper fan housing and a lower rotor housing containing a lubricant, a shaft between said fan and rotor, a reservoir between the fan housing and rotor housing including a member surrounding said shaft and so constructed and arranged as to hold the charge of lubricant regardless of the position in which the apparatus is placed.

9. An absorption refrigerating apparatus comprising a medium circuit, a motor fan unit for circulating a medium in said circuit, said unit comprising an upper fan housing and a lower rotor housing containing a lubricant and a reservoir between the rotor housing and the fan housing.

10. An absorption refrigerating apparatus of the type subject to pressure variations during operation comprising a closed circuit, said apparatus being charged with a volatile refrigerant, a motor fan unit for circulating said refrigerant in said circuit, said unit including a reservoir charged with a lubricant including an enlarged chamber between said reservoir and the remainder of the apparatus, said chamber being of sufficient size to contain lubricant foam which may foam from said reservoir as the result of the expansion of gas in the lubricant after a decrease in the internal pressure of the apparatus whereby the lubricant is retained in said enlarged chamber and reservoir.

11. A motor-pump assembly comprising a housing having a pump chamber and a motor chamber, a motor rotor mounted for rotation in said last named chamber and operatively connected with a pumping element in said pump chamber, a main reservoir for lubricant for said rotor, and means providing an auxiliary reservoir in communication with said main reservoir and capable of holding lubricant from said main reservoir whenever the assembly is displaced from a normal position, said reservoirs being so constructed and arranged that the lubricant cannot escape therefrom irrespective of the position of said assembly.

12. A motor-pump assembly comprising a housing having a pump chamber and a motor chamber, a motor-rotor mounted for rotation in said motor chamber, a pumping element mounted in said pump chamber and operatively connected to said rotor, said motor chamber including means providing a normal lubricant reservoir and an auxiliary reservoir capable of receiving and retaining the lubricant against escape into the pump chamber regardless of the operating conditions or of the position of the assembly, means providing a vent between the pump and motor chambers and positioned so as to prevent liquids from flowing from one of said chambers to the other.

13. A motor-pump assembly comprising an integral housing having a pump chamber and a motor chamber, a pumping element in said pump chamber, a motor rotor in said motor chamber connected to said element by a shaft, a combined bearing assembly and auxiliary lubricant reservoir mounted within said housing and supporting said shaft, a principal lubricant reservoir in said motor chamber for holding lubricant under normal conditions, said auxiliary reservoir being in communication with the principal reservoir and formed to prevent lubricant from escaping to said pump chamber under both normal and abnormal conditions of use and handling of said motor-pump assembly.

14. A motor-pump assembly for pumping a gaseous medium comprising a unitary housing having a pump chamber and a motor chamber, a rotor in said motor chamber connected by a shaft to a pumping element in said pump chamber, a motor stator mounted outside and surrounding a portion of said motor chamber, a charge of lubricant in said motor chamber, and means providing a free vent for gas between said pump and motor chambers but preventing the flow of lubricant from or of liquid to said motor chamber.

15. A hermetically sealed motor-pump assembly for use in pumping a gaseous medium comprising a unitary housing, a motor and a pumping chamber at opposite ends of said housing, a unitary movable structure including a pumping element in said pump chamber and a motor armature in said motor chamber, and means including a gas vent positioned to allow the free flow of gas between said chambers while preventing the flow of non-gaseous mediums therebetween.

16. A motor-pump assembly comprising a multi-chambered housing, a pumping element in one chamber, a motor armature in a second chamber, said second chamber comprising a reservoir for a body of lubricant, a driving connection between said armature and said element, means providing a housing for said driving connection extending into both of said chambers to prevent the transfer of liquid mediums therebetween.

17. In combination with the inert gas circuit of an absorption refrigeration apparatus, a motor-pump assembly comprising a unitary housing hermetically sealed to a portion of and in communication with the interior of said gas circuit normally conveying an inert gas, said housing having aligned chambers separated by an apertured partition, a gas pumping element in one of said chambers, a motor armature in the other chamber, a driving connection extending therebetween and passing through said aperture, bearing means for said armature, said other chamber including a lubricant reservoir, means extending though said aperture and sealed to said partition for preventing the transfer of lubricant from one chamber to the other and for preventing the flow of any liquid which may be in said inert gas circuit to said armature chamber irrespective of the operating conditions or position of said motor-pump assembly.

18. In combination with the evaporator and absorber and the inert gas circuit of an absorption refrigeration system, a motor-pump assembly for circulating the gaseous mediums including a refrigerant and an inert gas in said circuit, said assembly being hermetically sealed to and in open communication with the interior of said circuit and including a housing having a pump chamber and a motor chamber, a lubricant reservoir in said motor chamber, a chamber in free communication with said reservoir, means providing a vent between said pump and motor chambers, said chamber in communication with said reservoir having sufficient capacity to contain lubricant foam which may result from the expansion of occluded gases present in the lubricant, said expansion and foaming occurring as the result of a decrease in pressure in said inert gas circuit.

19. In an absorption refrigerating apparatus of the type in which the liquid mediums are circulated by a power driven circulator unit, a motor pump assembly comprising a housing having a pump chamber and a motor chamber, a motor rotor mounted for rotation in said motor chamber, a pumping element mounted in said pump chamber and operatively connected to said rotor, said motor chamber including means providing a normal lubricant reservoir and an auxiliary reservoir capable of receiving and retaining the lubricant against escape into the pump chamber regardless of the operating conditions or of the position of said assembly, means providing a vent between the pump and motor chambers and positioned so as to prevent liquid from flowing from one of said chambers to the other.

20. In combination, an absorption refrigerating apparatus, a motor pump assembly for pumping a gaseous medium comprising a unitary housing having a pump chamber and a motor chamber, a rotor in said motor chamber connected by a shaft to a pumping element in said pump chamber, a motor stator mounted outside and surrounding a portion of said motor chamber, a charge of lubricant in said motor chamber, and means providing a free vent for gas between said pump and motor chambers but preventing the flow of lubricant from or of liquid to said motor chamber.

21. In combination, an absorption refrigerating apparatus, a hermetically sealed motor pump assembly for use in pumping a gaseous medium comprising a unitary housing, a motor and a pumping chamber at opposite ends of said housing, a unitary movable structure including a pumping element in said pump chamber and a motor armature in said motor chamber, and means including a gas vent positioned to allow the free flow of gas between said chambers for preventing the flow of non-gaseous mediums therebetween.

22. An absorption refrigerating apparatus comprising circuits for liquid and gaseous mediums, a motor fan unit for circulating the mediums in their circuits, said motor fan unit being positioned in a part of said circuit normally inaccessible to liquid mediums but subject to an accumulation of liquid mediums under unusual conditions and comprising a vertically arranged fan casing and rotor shell with an apertured partition therebetween, said shell being charged with a lubricant, said partition and shell being of such shape and size that the level of the lubricant charge in the shell will never reach said aperture regardless of the position in which said apparatus is placed and means on the upper side of said partition for preventing liquid mediums from reaching the shell under unusual conditions.

23. An absorption refrigerating apparatus comprising, a medium circuit, a motor fan unit for circulating a liquid medium in said circuit, said unit comprising an upper fan housing and a lower rotor housing containing a lubricant, a reservoir between the rotor housing and the fan housing and means between the reservoir and fan housing for preventing said liquid medium from entering the reservoir.

24. An absorption refrigerating apparatus, said apparatus comprising circuits for working mediums, means for circulating inert gas in said circuit, said means being hermetically sealed within the walls of said apparatus and including a lubricant pocket separate from said medium circuit and a reservoir between said pocket and the medium circuit, said reservoir being so constructed and arranged as to hold the entire normal charge of lubricant in said pocket regardless of the position in which said apparatus may be placed during shipment or other handling operation.

25. An absorption refrigerating apparatus, said apparatus comprising a liquid medium circuit, an inert gas circuit, means for circulating inert gas in said circuit, said means being hermetically sealed within the walls of said apparatus and including a lubricant pocket located outside of the path of said circuit and means between said pocket and said circuit for preventing liquid mediums with which the apparatus is charged from reaching said pocket and lubricant with which said pocket is charged from reaching said circuit either when the apparatus is in its normal position or when it is placed in any position other than its normal operating position.

CURTIS C. COONS.
STANLEY R. CUMMINGS.